United States Patent
Wszolek et al.

[11] Patent Number: 5,737,545
[45] Date of Patent: Apr. 7, 1998

[54] COMPUTER BUS MASTERY SYSTEM AND METHOD HAVING A LOCK MECHANISM

[75] Inventors: Philip Wszolek; Barry Martin Davis, both of Phoenix; Brian Neil Fall, Chandler; Richard Demers, Peoria, all of Ariz.

[73] Assignee: VLSI Technology, Inc., San Jose, Calif.

[21] Appl. No.: 651,698

[22] Filed: May 21, 1996

[51] Int. Cl.$^6$ ...................................................... H01J 13/00
[52] U.S. Cl. .................... 395/288; 395/308; 395/306; 395/309; 395/287; 395/290; 395/293; 395/281; 395/822; 395/842; 395/847; 395/728; 395/733
[58] Field of Search ...................... 395/287, 288, 395/290, 306, 308, 309, 733, 800

[56] References Cited

U.S. PATENT DOCUMENTS

| | | | |
|---|---|---|---|
| 5,467,295 | 11/1995 | Young et al. | 395/200.05 |
| 5,506,995 | 4/1996 | Yoshinoto et al. | 395/800 |
| 5,555,381 | 9/1996 | Ludwig et al. | 395/281 |
| 5,557,758 | 9/1996 | Bland et al. | 395/308 |
| 5,572,734 | 11/1996 | Narad et al. | 395/726 |

*Primary Examiner*—Jack B. Harvey
*Assistant Examiner*—Raymond N. Phan
*Attorney, Agent, or Firm*—LaValle D. Ptak

[57] ABSTRACT

A method and system are designed to guarantee availability of ownership of an ISA bus by a bus mastering or a direct memory access device in a system also including a PCI bus. This is accomplished by placing a lock on the PCI bus through a bridge device to a configuration read of a PCI configuration space register. Once the lock is established, other PCI devices are prevented from locking any other resource on the PCI bus. The PCI configuration space exists outside of the memory or I/O ranges to which an ISA resident device can generate access. Consequently, whenever the ISA resident device generates its access, it is to a device known not to be in a locked state. Consequently, the bus transaction is capable of completion within the time limit expected by the ISA resident device.

11 Claims, 2 Drawing Sheets

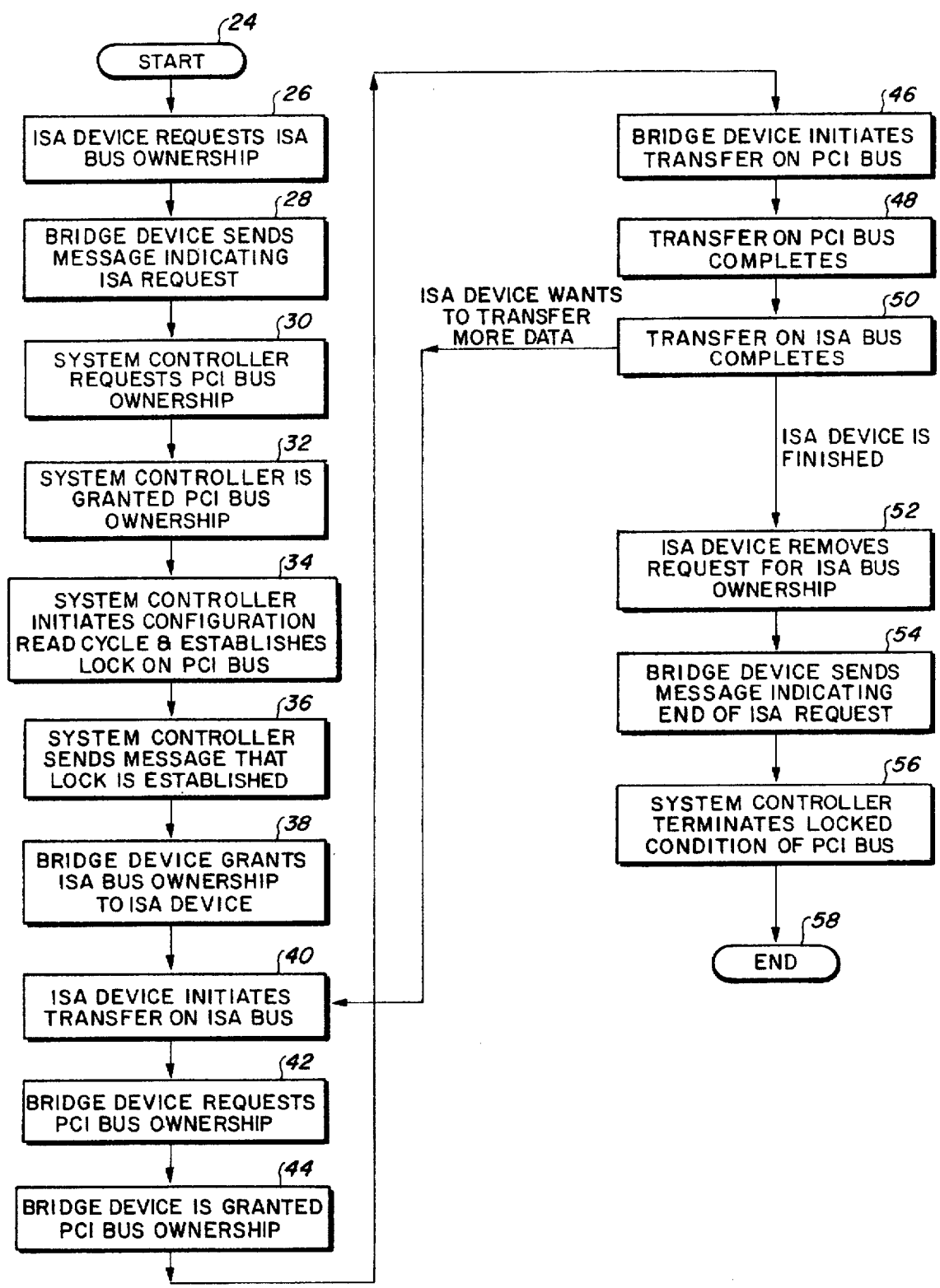

COMPUTER BUS MASTERY SYSTEM AND METHOD HAVING A LOCK MECHANISM

BACKGROUND

Over the years, as personal computers have become increasingly powerful, the system architecture also has undergone change. Early personal computers used a bus system incorporating what is known as Industry Standard Architecture (ISA) buses. Devices which are designed to operate with an ISA bus can have a time limit within which bus transactions are expected to be completed. ISA bus transactions cannot be re-tried (except start-to-finish) after the start command for the transaction takes place. In addition, ISA transactions cannot generate configuration cycles.

Newer personal computers also use a different bus, known as a Peripheral Component Interconnect (PCI) bus. PCI buses have a locking mechanism to guarantee exclusive access to system resources whenever a device on the PCI bus requests ownership of the bus.

Current personal computers typically are designed to operate devices on both ISA and PCI buses. The ISA bus is considered an expansion bus; and the two buses are connected with a bridge device to provide access to devices on each of the buses. A problem exists, however, if a mastering or DMA device on the ISA bus attempts to access a system resource residing on the PCI side of the bridge. If that PCI resource has been locked; the ISA bus transaction may not complete with the time limit the originating device expects. When this occurs, incorrect system operation may result.

In contrast to the somewhat restrictive nature of ISA bus transactions, PCI bus transactions can be re-tried and bus ownership can be preempted. In addition, the PCI bus may be used to generate configuration cycles. The PCI bus interface requires a minimum number of 47 pins for a target-only device, and 49 pins for a master to handle data and addressing. The minimum number of pins for a planar-only device is 45 for a target-only and 47 for a master, since the two error reporting pins are optional for planar-only applications.

The required PCI pins are organized into different groups to handle data and addressing, interface control, arbitration, and system functions. Many PCI compliant devices may assume a combination of a master/target device. The address and data pins are identified as AD[31:0]. The interface control pins include FRAME#, TARGET READY (TRDY#), INITIATOR READY (IRDY#), STOP#, DEVICE SELECT (DEVSEL#), and INITIALIZATION DEVICE SELECT (IDSEL#). For masters only, the arbitration pins for requesting the PCI bus ownership (REQ#) and for granting PCI bus ownership (GNT#) are included. For both master and target devices, the system inputs for clock (CLK) and for re-set (RST#) are included. The CLK signal provides timing for all transactions on the PCI bus, and is an input to every PCI device. The re-set, RST#, is used to bring PCI-specific registers, sequencers and signals to a consistent state. It should be noted that RST# may be asynchronous to CLK when it is asserted or de-asserted.

The address and data pins AD[31:0] are multiplexed on the same PCI pins. A bus transaction consists of an address phase followed by one or more data phases; and the PCI supports both read and write bursts. It should be noted that the address phase is the clock cycle in which FRAME# is asserted. During the address phase AD[31:0] contains a physical address (32 bits). For I/O this is a byte address; for configuration and memory, it is a DWORD address. During data phases AD[07:0] contain the least significant byte (1sb) and AD[31:24] contain the most significant byte (msb). Write data is stable and valid when IRDY# is asserted; and read data is stable and valid when TRDY# is asserted. Data is transferred during those clocks where both IRDY# and TRDY# are asserted.

The interface control pins have been identified above. FRAME# constitutes the cycle frame. This pin is driven by the current master to indicate the beginning and duration of an access. FRAME# is asserted to indicate a bus transaction is beginning. While FRAME# is asserted, data transfers continue. When FRAME# is deasserted, the transaction is in the final data phase or has been completed.

Initiator ready (IRDY#) indicates the ability of the initiating agent (bus master) to complete the current data phase of the transaction. This signal is used in conjunction with target-ready (TRDY#). A data phase is completed on any clock, when both IRDY# and TRDY# are asserted. During a write, IRDY# indicates that valid data is present on AD[31:0]. During a read, it indicates the master is prepared to accept data. Wait cycles are inserted until both IRDY# and TRDY# are asserted together.

Target ready (TRDY#) indicates the ability of the target agent (selected device) to complete the current data phase of the transaction. TRDY# is used in conjunction with IRDY#, as mentioned above. During a read, TRDY# indicates that valid data is present on AD[31:0]. During a write, it indicates that a target is prepared to accept data. Stop (STOP#) indicates the current target is requesting the master to stop the current transaction.

Initialization device select (IDSEL) is used as a chip select during configuration read and write transactions. Device select (DEVSEL#), when actively driven, indicates the driving device has decoded its address as the target of the current access. As an input, DEVSEL# indicates whether any device on the bus has been selected. For bus masters, request (REQ#) indicates to the arbiter that this agent desires use of the bus. This is a point-to-point signal. Every master has its own REQ#, which must be tri-stated while RST# is asserted. For a master device, grant (GNT#) indicates to the agent that access to the bus has been granted. This also is a point-to-point signal. Every master has its own GNT# which must be ignored while RST# is asserted.

In addition to the minimum pins which are discussed above, optional pins are provided for many PCI compliant devices. These optional pins constitute 64 bit extensions, interface control, interrupts, cache support and other inputs. For the purpose of operating a system for bridging between an ISA bus or device and a PCI bus and the devices connected thereto, a lock signal (LOCK#) is important.

LOCK# indicates an "atomic" operation, which may require multiple transactions to complete. When LOCK# is asserted, nonexclusive transactions may proceed to an address that is not currently locked. A grant to start a transaction on the PCI bus does not guarantee control of LOCK#. Control of LOCK# is obtained under its own protocol in conjunction with GNT#. It is possible for different agents to use the PCI bus while a single master retains ownership of LOCK#. If a device implements executable memory, it also must implement LOCK# and guarantee complete access exclusion in that memory. A target of an access that supports LOCK# must provide exclusion to a minimum of 16 bytes (aligned). Host bridges which have a system memory behind them need to implement LOCK# as a target from the PCI bus point of view and, optionally, as a master.

Accordingly, it is desirable to provide a system and its method of operation which guarantees the availability of system resources, and which overcomes the disadvantages of the prior art for systems employing both an ISA bus and a PCI bus, to ensure completion of ISA bus transactions.

SUMMARY OF THE INVENTION

It is an object of this invention to provide an improved bus mastering system and method for a computer.

It is another object of this invention to provide an improved bus mastering system and method for interconnecting two buses with a bridge device.

It is an additional object of this invention to provide a bus mastering system and method for connecting an ISA bus and a PCI bus with a bridge device.

It is a further object of this invention to provide an improved bus mastering system and method for connecting an ISA bus and a PCI bus through a bridge device, which guarantees the ability for an ISA resident device to complete the bus transaction.

In accordance with a preferred embodiment of the invention, a method for establishing bus mastery to a device on an expansion bus for a system resource residing on another bus first provides a bridge device between the expansion bus and the other bus. The bridge device operates to pass unclaimed cycles from the other bus to the expansion bus and to pass expansion bus cycles to the other bus. Ownership of the expansion bus is requested by an expansion bus device, through the bridge device. The other bus then is locked through a lock configuration read of a configuration space register on the other bus. Next, ownership of the expansion bus is granted to an expansion bus device; and ownership of the other bus is requested by the bridge device. Finally, data is transferred on the expansion bus and the other bus within the time limit expected by the resident device on the expansion bus.

BRIEF DESCRIPTION OF THE DRAWING

FIG. 2 is a flow chart of the method of operation of the system shown in FIG. 1.

DETAILED DESCRIPTION

Figure 1:
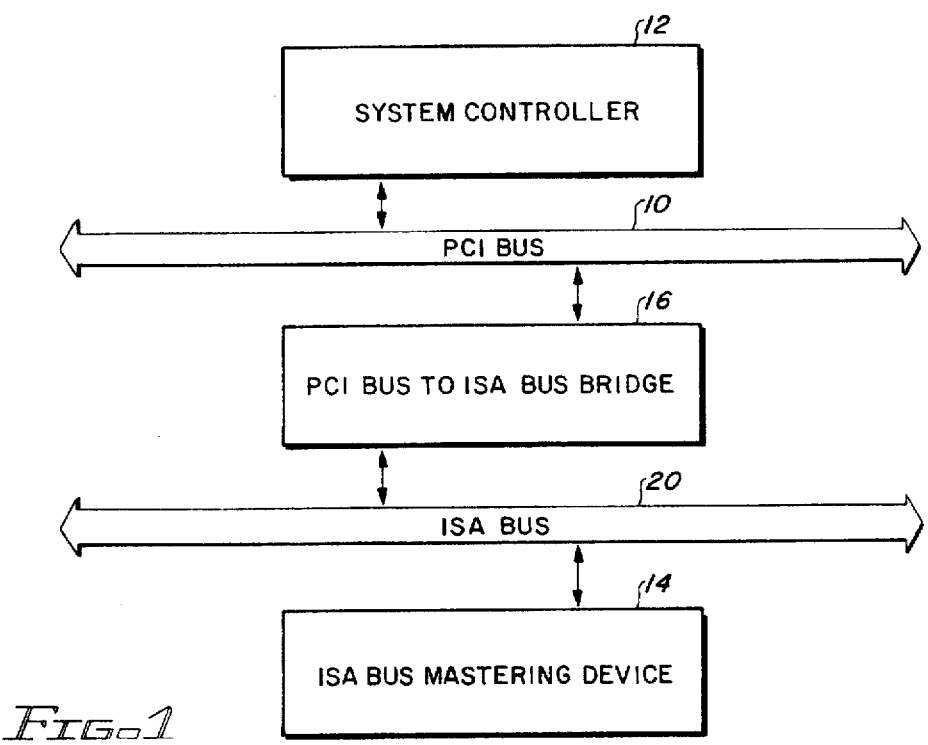
FIG. 1 is a block diagram of a preferred embodiment of the invention.

Reference now should be made to the drawings. FIG. 1 is a block diagram of a preferred embodiment of the invention. As illustrated in FIG. 1, the system is used in conjunction with a computer such as a personal computer which includes two buses, a PCI bus 10 and an ISA bus 20. A system controller 12 is coupled with the PCI bus 10. The controller 12 includes a PCI arbiter and a PCI initiator interface for generating PCI configuration space read cycles. An ISA bus mastering device 14 is coupled with the ISA bus 20. The mastering device 14 typically includes the ISA networking cards which are commonly used with personal computers.

Interconnecting the buses 10 and 20 is a PCI bus to ISA bus bridge circuit 16. This bridge device is a subtractive decode agent, which passes unclaimed PCI cycles onto the ISA bus. The bridge 16 also passes ISA cycles out onto the PCI bus and includes a highest priority requester. The subtractive decoding operation of the bridge 16 is a standard method of address decoding, in which a device accepts all accesses not positively decoded by other agents.

The circuit of FIG. 1 operates to ensure that all ISA bus transactions may be completed within the time limit expected by the ISA resident device for such transactions. Consequently, before a bus mastering or direct memory access device 14 is granted ownership of the ISA bus 20, a lock on the PCI bus 10 is established through the operation of the bridge circuit 16 and the system controller 12. This is accomplished by doing a locked configuration read of a PCI configuration space register through the controller 12. This established lock prevents any other PCI device from locking any other resource, as only one resource at a time may be locked on the PCI bus 10. This is in accordance with standard PCI protocol.

The PCI configuration space, established by the system controller 12 in response to a request from the bridge 16, exists outside of the memory or I/O ranges to which an ISA resident device can generate accesses. Consequently, when an ISA resident device, such as device 14, generates its access on the ISA bus 20, it is to a device known not to be in a locked state. Consequently, the ISA resident device on the ISA bus 20 is able to complete a bus transaction within the time limit expected by the ISA resident device.

Figure 3:
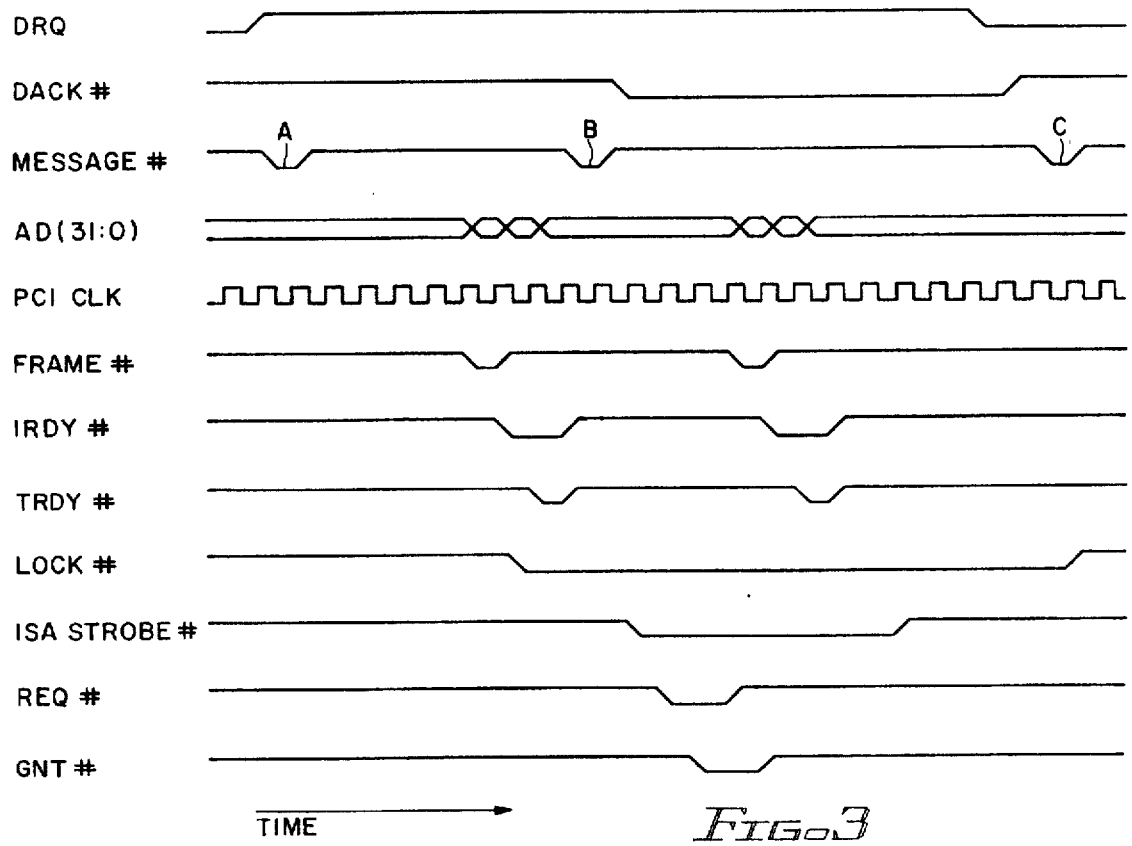
FIG. 3 is a waveform timing diagram useful in explaining the operation of the flow chart of FIG. 2 and the operation of the embodiment shown in FIG. 1.

Reference now should be made to FIGS. 2 and 3, which taken together disclose the method of operation of the system shown in FIG. 1. FIG. 2 is a flow chart of the requests and operation of the system at various stages, from start at 24 to end at 58. FIG. 3 illustrates waveforms corresponding to the operations of the various blocks shown in FIG. 2; and FIG. 3 should be considered along with the description of the method of FIG. 2.

Following start up at 24, if an ISA device requests ownership of the ISA bus at 26, this is accomplished through the request DRQ shown in the top waveform of FIG. 3. The bridge 16 sends a message from the ISA bus 20 to the PCI bus 10 indicating the ISA request. In FIG. 3 this is indicated as the waveform "MESSAGE#". Upon receipt of this request, the system controller 10 requests PCI bus ownership at 30, as shown in FIG. 2. This bus ownership, however, can be held off if the PCI bus 10 is busy at the time the ownership request is made.

If the PCI bus is free, or when the PCI bus 10 becomes free, the system controller 12 is granted PCI bus ownership at 32. Upon obtaining PCI bus ownership, the system controller 12 initiates a configuration read cycle to itself at 34 for a piece of the configuration space, and establishes a configuration lock on the PCI bus. This is shown in FIG. 3 by the signal TRDY#. In addition, the controller 12 drives the signals FRAME# and IRDY# at 34.

Once the system controller establishes the PCI bus lock, it sends a message that the lock is established at 36. This message is the MESSAGE# signal "B" on the waveform MESSAGE# of FIG. 3. After establishment of the lock, the bridge device 16 grants ISA bus 20 ownership to the ISA device requesting ownership, which is illustrated in FIG. 1 as the device 14. This is done at 38 in the flow chart of FIG. 2 and is the signal DACK# shown in FIG. 3. Once the ownership of the ISA bus is granted to the device 14, ISA device 14 initiates transfer on the ISA bus, as shown at 40 in FIG. 2. This is indicated as the ISA STROBE# signal in FIG. 3.

The bridge device 16 then responds to the ISA STROBE# signal and requests PCI bus ownership at 42. This is the signal REQ# shown in FIG. 3. Since the locked configuration read space on the PCI bus 10 is outside of the ranges to which an ISA resident device (such as device 14) can generate access, the request made at 42 is to a device which is known not to be in a locked state. Consequently, bridge device 16 is granted PCI bus ownership at and this is indicated in FIG. 3 by the waveform GNT#. Once the request has been granted, the bridge device 16 initiates transfer on the PCI bus at 46, as shown in FIG. 2. The transfer on the PCI bus is completed at 48, as indicated by the second TRDY# signal in the time sequence shown in FIG. 3.

The transfer on the ISA bus is completed at 50, as shown by the end of the ISA STROBE# signal in FIG. 3. If the ISA device wants to transfer more data, a new request is made at 40, as shown in FIG. 2; and the foregoing sequence from the transfer initiation at 40 to the completion of the transfer at 50 is repeated.

If the ISA device requesting data transfer is finished, the ISA device removes the request for ISA bus ownership at 52; and this is indicated by the request removal in the waveform DRQ of FIG. 3. The bridge device 16 then responds to this removal of request by sending a message MESSAGE#C. This message is received by the system controller 12 of FIG. 1, which then terminates the locked condition of the PCI bus at 56, as shown on the right-hand end of the waveform LOCK# in FIG. 3. Upon termination of the locked condition of the PCI bus, the end of the transfer is indicated at 58. The system then is ready for a new transfer whenever an ISA device requests ISA bus ownership from the system.

It should be noted that all of the waveform signals which are shown in FIG. 3 simultaneously occur with respect to time, as indicated in FIG. 3. All of the various signals are controlled by the PCI CLK signal which is also shown in FIG. 3.

By utilizing the system and method described above, ISA devices always are able to complete the bus transaction within the time limit expected by such ISA resident devices, as described above.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. In a computer system, a method for establishing bus mastery to a device on an expansion bus for a system resource residing on another bus having a locking mechanism to guarantee exclusive access for said device to system resources on such another bus, including the steps of:

providing a bridge device between said expansion bus and said another bus to pass unclaimed cycles from said another bus to said expansion bus and to pass expansion bus cycles to said another bus;

initiating an ownership request of said expansion bus by an expansion bus device through said bridge device;

locking said another bus in response to said ownership request through a locked configuration read of a configuration space register on said another bus to prevent devices on said another bus from locking any other resources on said another bus;

granting ownership of said expansion bus to an expansion bus device;

requesting ownership of said another bus by said bridge device; and transferring data between said expansion bus device on said expansion bus and a system resource on said another bus.

2. The method according to claim 1 wherein said expansion bus is an ISA bus and said another bus is a PCI bus.

3. The method according to claim 1 wherein said bridge device is a subtractive decode agent.

4. The method according to claim 1 further including the steps of removing said request for ownership of said expansion bus by said said expansion bus device to said bridge device; and terminating said locking of said another bus by said bridge device.

5. The method according to claim 2 wherein said bridge device is a subtractive decode agent.

6. The method according to claim 2 further including the steps of removing said request for ownership of said expansion bus by said said expansion bus device to said bridge device; and terminating said locking of said another bus by said bridge device.

7. The method according to claim 5 further including the steps of removing said request for ownership of said expansion bus by said said expansion bus device to said bridge device; and terminating said locking of said another bus by said bridge device.

8. A computer system including an expansion bus and another bus, with a system controller coupled with said another bus for establishing a lock on said another bus in response to a request from a device on said expansion bus, said system including in combination:

a bridge device coupled between said expansion bus and said another bus to pass unclaimed cycles from said another bus to said expansion bus and to pass expansion bus cycles to said another bus; and an expansion bus device coupled with said expansion bus for requesting ownership thereof through said bridge device causing said bridge device to operate said system controller to lock said another bus through a locked configuration read of a configuration space register on said another bus to prevent devices on said another bus from locking any other resources on said another bus, whereupon said bridge device grants bus ownership of said expansion bus to said expansion bus device.

9. The combination according to claim 8 wherein said expansion bus is an ISA bus and said another bus is a PCI bus.

10. The combination according to claim 8 wherein said bridge device is a subtractive decode agent.

11. The combination according to claim 9 wherein said bridge device is a subtractive decode agent.

* * * * *